US012416232B2

(12) United States Patent
Zhao et al.

(10) Patent No.: US 12,416,232 B2
(45) Date of Patent: Sep. 16, 2025

(54) REAL-TIME TOOL MODE WAVEFORM REMOVAL

(71) Applicant: Halliburton Energy Services, Inc., Houston, TX (US)

(72) Inventors: Jiajun Zhao, Singapore (CN); Ruijia Wang, Singapore (CN); Brenda Sue Jonathan, Bangko (TH)

(73) Assignee: Halliburton Energy Services, Inc., Houston, TX (US)

( * ) Notice: Subject to any disclaimer, the term of this patent is extended or adjusted under 35 U.S.C. 154(b) by 231 days.

(21) Appl. No.: 17/531,657

(22) Filed: Nov. 19, 2021

(65) Prior Publication Data

US 2023/0160301 A1    May 25, 2023

(51) Int. Cl.
  *E21B 47/14*   (2006.01)
  *G01V 1/48*    (2006.01)
  *H04B 1/02*    (2006.01)
  *H04B 11/00*   (2006.01)

(52) U.S. Cl.
  CPC .............. *E21B 47/14* (2013.01); *G01V 1/48* (2013.01); *H04B 11/00* (2013.01); *H04B 1/02* (2013.01)

(58) Field of Classification Search
  CPC .......... E21B 47/14; E21B 47/12; E21B 47/00; G01V 1/48; G01V 1/44; G01V 1/40; G01V 1/00; G01V 1/36; G01V 2210/54; G01V 2210/59; G01V 1/50; G01V 1/46; G01V 2200/16; H04B 11/00; H04B 1/02; H04B 1/00
  See application file for complete search history.

(56) References Cited

U.S. PATENT DOCUMENTS

| 6,453,240 B1* | 9/2002 | Blanch ............... G01V 1/48 702/11 |
| 2004/0122595 A1* | 6/2004 | Valero ............... G01V 1/48 702/11 |
| 2017/0184752 A1* | 6/2017 | Walker ............... G01V 1/50 |
| 2017/0212274 A1 | 7/2017 | Sun et al. |
| 2017/0371058 A1 | 12/2017 | Li et al. |

(Continued)

OTHER PUBLICATIONS

Wang, R. and Zhao, J. 2021. LWD monopole processing with an adaptive tool-borne wave predicto. In SEG 2021, published Sep. 1, 2021.

*Primary Examiner* — Mohamed Charioui
(74) *Attorney, Agent, or Firm* — Benjamin Ford; C. Tumey Law Group, PLLC

(57) ABSTRACT

Methods and systems for removing tool mode waveforms. The method may include disposing a bottom hole assembly (BHA) into a wellbore. The BHA may comprise at least one transmitter configured to transmit a pressure pulse and at least one receiver configured to record one or more waveforms. The method may further comprise performing a logging-while-drilling (LWD) operation in which the one or more waveforms are recorded with the at least one receiver, transmitting the one or more waveforms to an information handling system, removing one or more tool mode waveforms from the one or more waveforms to form an updated set of waveforms, and forming differential phase time semblance map based at least in part on the updated set of waveforms. The system may comprise the BHA and information handling system configured to remove one or more tool mode waveforms.

20 Claims, 6 Drawing Sheets

(56) References Cited

U.S. PATENT DOCUMENTS

| | | |
|---|---|---|
| 2019/0018161 A1 | 1/2019 | Wang et al. |
| 2019/0018162 A1 | 1/2019 | Wang et al. |
| 2019/0025451 A1 | 1/2019 | Wang et al. |
| 2019/0025452 A1 | 1/2019 | Wang et al. |
| 2019/0086571 A1* | 3/2019 | Walker .................. G01V 1/303 |
| 2019/0257971 A1 | 8/2019 | Wang et al. |
| 2019/0317238 A1 | 10/2019 | Wang et al. |
| 2020/0341163 A1 | 10/2020 | Wang et al. |
| 2021/0048546 A1 | 2/2021 | Wang et al. |
| 2021/0108510 A1 | 4/2021 | Ge et al. |
| 2021/0141115 A1 | 5/2021 | Wang et al. |
| 2021/0208299 A1 | 7/2021 | Wang et al. |
| 2021/0231822 A1 | 7/2021 | Wang et al. |
| 2021/0286099 A1 | 9/2021 | Wang et al. |
| 2021/0311222 A1 | 10/2021 | Wang et al. |
| 2021/0325558 A1 | 10/2021 | Wang et al. |
| 2021/0333428 A1 | 10/2021 | Wang et al. |

* cited by examiner

REAL-TIME TOOL MODE WAVEFORM REMOVAL

BACKGROUND

Wellbores drilled into subterranean formations may enable recovery of desirable fluids (e.g., hydrocarbons) using any number of different techniques. Acquiring properties of subterranean formations may enhance the recovery of desirable fluids. Identifying formation properties may be performed by many different systems and methods. One such system and method may capture formation properties by utilizing pressure pulses. Pressure pulses, which may also be referred to as acoustic waves, reflect off different parts of a formation or wellbore. The reflected pressure pulses may form secondary pressure pulses or secondary acoustic waves. In examples, these secondary pressure pulses may be shear velocity waves. Shear velocity waves may yields provide information on formation properties.

Acoustic logging relies on the analysis of seismic waves generated and recorded within a borehole. These waves provide information about the borehole and the surrounding formation. Logging-while-drilling (LWD) is an operation in which acoustic logging is performed while drilling operations are ongoing simultaneously. This may allow for formation properties to be identified in real time. Unlike wireline logging, acoustic LWD data acquisition and recording occurs in real-time while drilling when relatively little fluid has invaded the formation. A typical acoustic LWD system may comprise the drill collar, the fluid-filled borehole, and acoustic sources and receivers, embedded on the drill collar. The influence of the massive drill collar, inside the borehole, has a significant impact on acoustic waveforms in the form of noise, which may suppress formation acoustic waveform. Additionally, tool mode waveforms further suppress formation acoustic waveforms.

Currently, real-time slowness processing in an acoustic LWD environment may not be able to identify formation acoustic waveforms. This is due to drilling noise, tool mode waveforms, and other variable that may suppress formation acoustic waveform arrivals. Methods and systems are needed to remove unwanted waveforms in real time.

BRIEF DESCRIPTION OF THE DRAWINGS

These drawings illustrate certain aspects of some examples of the present disclosure, and should not be used to limit or define the disclosure.

DETAILED DESCRIPTION

Discussed below are systems and methods for real-time tool mode waveform removal from acoustic logs that is independent of depth measurements. Acoustic logs may be taken during logging-while-drilling (LWD) operations. These acoustic logs may associate waveforms at different depths. In post processing, where we have both acquired array waveforms and the corresponding depth log, tool mode waveforms may be recognized by their constant character through lithological change. Due to these properties, of tool mode waveforms, various methods such as frequency-wavenumber filters may be applied with the merit of the depth log available. However, in the real-time processing, corresponding depth log has not been created and thus is not accessible. There is an imperative demand for finding a real-time method to remove tool mode waveforms effectively.

Figure 1:
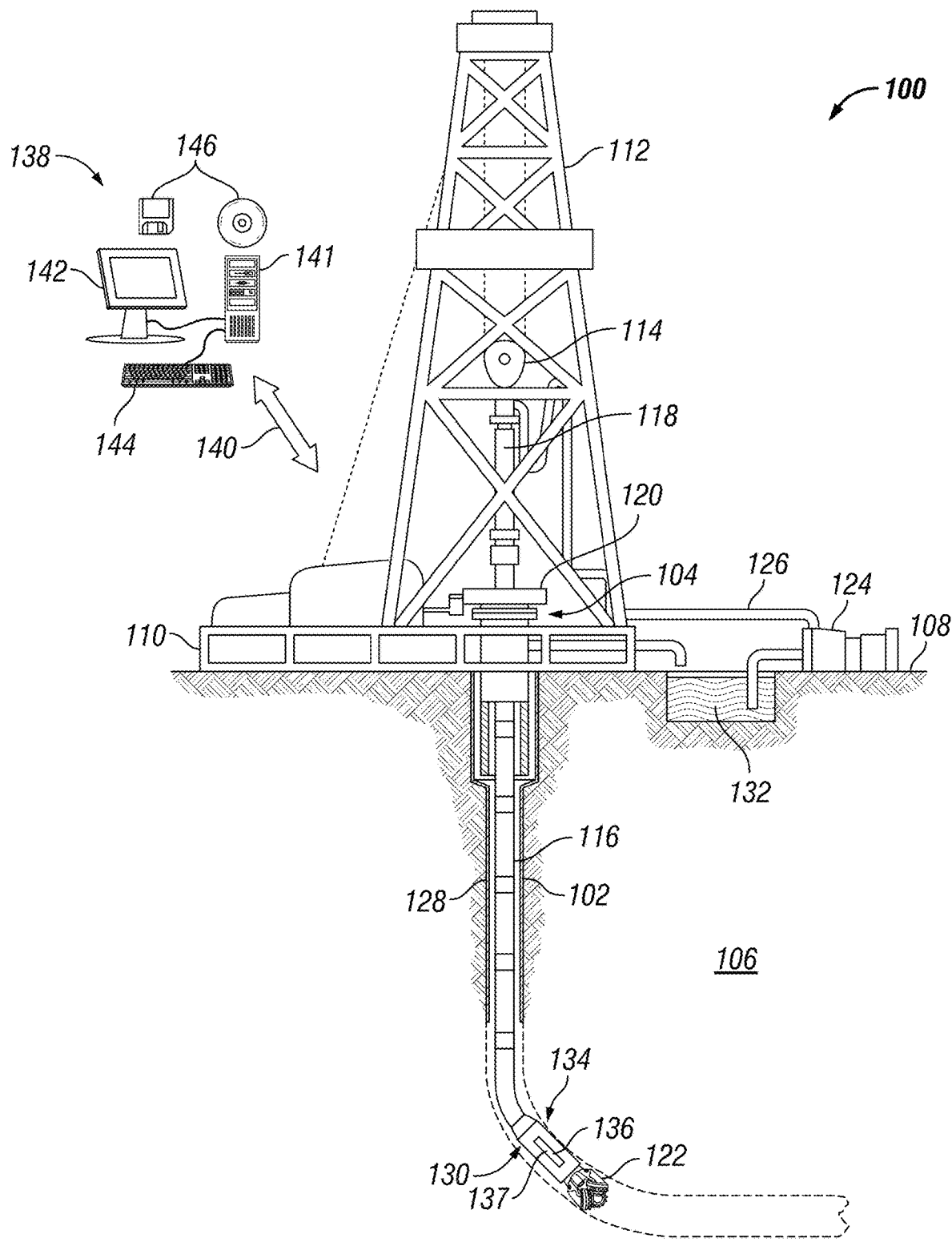
FIG. 1 illustrates an example of a drilling system.

FIG. 1 illustrates a drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extend generally vertically into the subterranean formation 106, however wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depicts land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly (BHA) 130 at distal end of drill string 116. BHA 130 may further include tools for look-ahead resistivity applications. As will be appreciated by those of ordinary skill in the art, BHA 130 may be a measurement-while drilling (MWD) or logging-while-drilling (LWD) system.

BHA 130 may comprise any number of tools, transmitters, and/or receivers to perform downhole measurement operations. For example, as illustrated in FIG. 1, BHA 130 may include a measurement assembly 134. It should be noted that measurement assembly 134 may make up at least a part of BHA 130. Without limitation, any number of different measurement assemblies, communication assemblies, battery assemblies, and/or the like may form BHA 130 with measurement assembly 134. Additionally, measurement assembly 134 may form BHA 130 itself. In examples, measurement assembly 134 may comprise at least one transmitter 136 and at least one receiver 137. Transmitter 136 may be an acoustic source that transmit pressure pulses, i.e., acoustic waves, into subterranean formation 106. Receiver 137 may operate and function to record any number of acoustic waveforms, such as pressure pulses that may have reflected off subterranean formation 106 (i.e., an echo), come from tools used in drilling operations, drilling operation noise, direct coupling from transmitter 136, and/or the like. It should be noted that transmitters 136 and receiver 137 may be transducers and in examples may both transmitter 136 and receiver 137 may be the same transducer. Additionally, one or more receiver 137 may be used to form a receiver array, which may record waveforms over a range of distances. Both transmitter 136 and receiver 137 may be disposed at the surface of measurement assembly 134 and/or may also be disposed within measurement assembly 134. Without limitation, transmitters 136 and receivers 137 may be disposed ninety degrees from each other. However, it should be noted that there may be any number of transmitters 136 and receivers 137 disposed along BHA 130 at any degree from each other. Additionally, transmitters 136 and receivers 137 may be aligned on top of each other and spaced about the axis of BHA 130.

Without limitation, BHA 130 and all parts within BHA 130 (i.e., transmitters 136 and receivers 137) may be connected to and/or controlled by information handling system 138, which may be disposed on surface 108. Without limitation, information handling system 138 may be disposed downhole in BHA 130. Processing of information recorded may occur downhole and/or on surface 108. Processing occurring downhole may be transmitted to surface 108 to be recorded, observed, and/or further analyzed. Additionally, information recorded on information handling system 138 that may be disposed downhole may be stored until BHA 130 may be brought to surface 108. In examples, information handling system 138 may communicate with BHA 130 through a communication line (not illustrated) disposed in (or on) drill string 116. In examples, wireless communication may be used to transmit information back and forth between information handling system 138 and BHA 130. Information handling system 138 may transmit information to BHA 130 and may receive as well as process information recorded by BHA 130. In examples, a downhole information handling system (not illustrated) may include, without limitation, a microprocessor or other suitable circuitry, for estimating, receiving and processing signals from BHA 130. Downhole information handling system (not illustrated) may further include additional components, such as memory, input/output devices, interfaces, and the like. In examples, while not illustrated, BHA 130 may include one or more additional components, such as analog-to-digital converter, filter and amplifier, among others, that may be used to process the measurements of BHA 130 before they may be transmitted to surface 108. Alternatively, raw measurements from BHA 130 may be transmitted to surface 108.

Any suitable technique may be used for transmitting signals from BHA 130 to surface 108, including, but not limited to, wired pipe telemetry, mud-pulse telemetry, acoustic telemetry, and electromagnetic telemetry. While not illustrated, BHA 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from BHA 130 to an information handling system 138 at surface 108. Information handling system 138 may include a personal computer 141, a video display 142, a keyboard 144 (i.e., other input devices), and/or non-transitory computer-readable media 146 (e.g., optical disks, magnetic disks) that can store code representative of the methods described herein. In addition to, or in place of processing at surface 108, processing may occur downhole.

As discussed below, methods may be utilized by information handling system 138 to determine properties of subterranean formation 106. Information may be utilized to produce an image, which may be generated into a two or three-dimensional models of subterranean formation 106. These models may be used for well planning, (e.g., to design a desired path of wellbore 102). Additionally, they may be used for planning the placement of drilling systems within a prescribed area. This may allow for the most efficient drilling operations to reach a subsurface structure. During drilling operations, measurements taken within wellbore 102 may be used to adjust the geometry of wellbore 102 in real time to reach a geological target. Measurements collected from BHA 130 of the formation properties may be used to steer drilling system 100 toward a subterranean formation 106.

Figure 2:
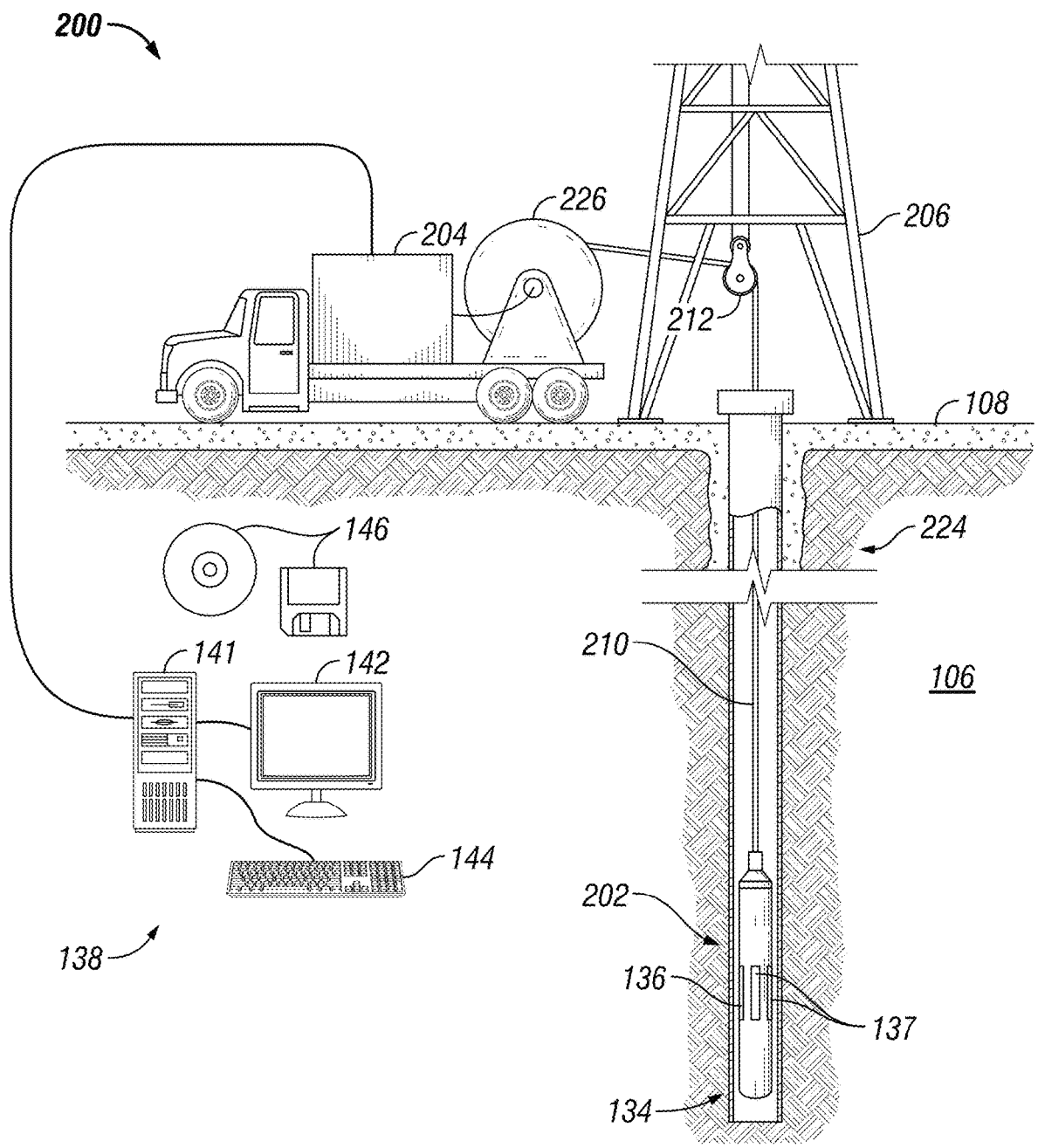
FIG. 2 illustrates an example of a well measurement system.

FIG. 2 illustrates a cross-sectional view of a well measurement system 200. As illustrated, well measurement system 200 may comprise downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. In some embodiments, conveyance 210 may provide mechanical suspension, as well as electrical and/or optical connectivity, for downhole tool 202. Conveyance 210 may comprise, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by receiver 148 may be stored on memory and then processed by downhole tool 202.

The processing may be performed real-time during data acquisition or after recovery of downhole tool 202. For this disclosure, real-time is a duration of time ranging from about a second to about ten minutes. Processing may alternatively occur downhole or may occur both downhole and at surface. In some embodiments, signals recorded by downhole tool 202 may be conducted to information handling system 138 by way of conveyance 210. Information handling system 138 may process the signals, and the information contained therein may be displayed for an operator to observe and stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from wellbore 102. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produced in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown) which may determine the amount of pull on conveyance 210 at the surface of wellbore 102. Information handling system 138 may comprise a safety valve (not illustrated) which controls the hydraulic pressure that drives drum 226 on vehicle 204 which may reel up and/or release conveyance 210 which may move downhole tool 202 up and/or down wellbore 102. The safety valve may be adjusted to a pressure such that drum 226 may only impart a small amount of tension to conveyance 210 over and above the tension necessary to retrieve conveyance 210 and/or downhole tool 202 from wellbore 102. The safety valve is typically set a few hundred pounds above the amount of desired safe pull on conveyance 210 such that once that limit is exceeded, further pull on conveyance 210 may be prevented.

As illustrated in FIG. 2, downhole tool 202 may include measurement assembly 134. It should be noted that measurement assembly 134 may make up at least a part of downhole tool 202. Without limitation, any number of different measurement assemblies, communication assemblies, battery assemblies, and/or the like may form downhole tool 202 with measurement assembly 134. Additionally, measurement assembly 134 may form downhole tool 202 itself. In examples, measurement assembly 134 may comprise at least one transmitter 136 and at least one receiver 137. As noted above, transmitters 136 and receivers 137 may be transducers. Additionally, the transmitters 136 and receivers 137 may operate, function, and be disposed according to the systems and methods described above and/or below.

Figure 3:
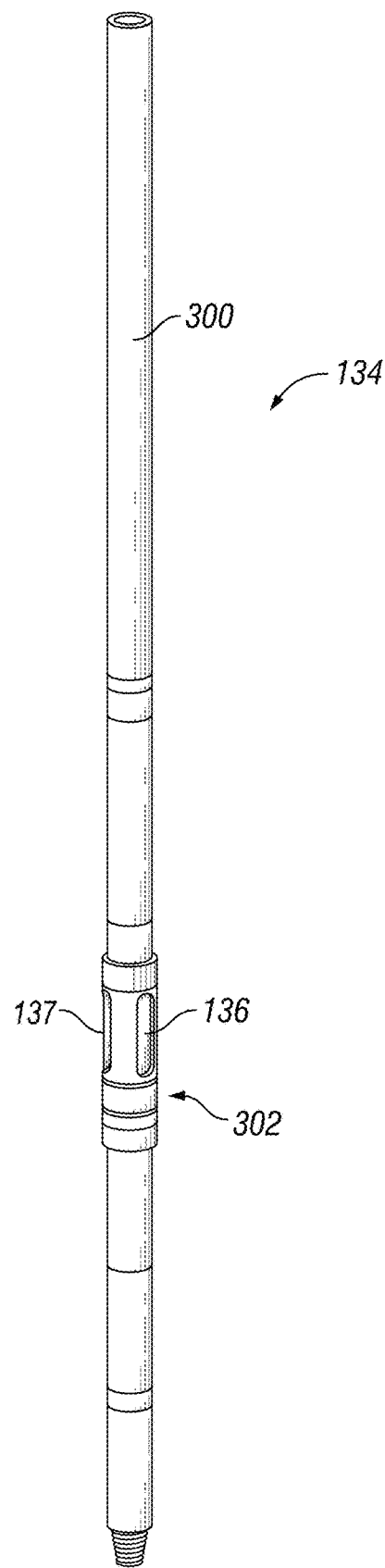
FIG. 3 illustrates an example of a measurement assembly.

FIG. 3 illustrates an expanded view of measurement assembly 134. As illustrated, measurement assembly 134 may comprise at least one battery section 300 and at least on instrument section 302. Battery section 300 may operate and function to enclose and/or protect at least one battery that may be disposed in battery section 300. Without limitation, battery section 300 may also operate and function to power measurement assembly 134. Specifically, battery section 300 may power at least one transmitter 136 and at least one receiver 148, which may be disposed at any end of battery section 300 in instrument section 302.

Instrument section 302 may house at least one transmitter 136 and at least one receiver 137. As describe above, transmitters 136, which may also be a transducer, may operate and function and operate to generate a pressure pulse that travels through wellbore fluids. The pressure pulse may have a frequency range from 10 Hz~20 kHz. It should be noted that the pulse signal may be emitted with different frequency content. In examples, transmitter 136 may be referred to as a transducer, which generates a pressure pulse, travelling in the wellbore fluids to interact with wellbore 102 (e.g., referring to FIG. 1). In examples, a pressure pulse may be referred to as an acoustic wave, acoustic waveforms, and/or the like. During operations a pressure pulse may reflect of any number of surfaces in wellbore 102. The reflected acoustic waves may be received by a receiver 137 or an array of receivers 137 a few inches to a few feet away from transmitter 136.

As noted above, drilling system 100 (e.g., referring to FIG. 1) may perform logging-while-drilling (LWD) operations. Generally, BHA 130 may house one or more transmitters 136 and/or receivers 137. In examples, both transmitters 136 and/or acoustic receivers 137 may be transducers. Additionally, transducers may operate and/or function as both a transmitter 136 and a receiver 137. BHA 130 may also comprise one or more drill collars, which may add weight to drill bit 122 during drilling operations. Drill collars, due to size and weight, may impact wavefields and thus, waveforms. For example, acoustic waves created by the downhole operation and/or transmitted during downhole operations may travel through BHA 130. These types of acoustic waves may be identified as "tool mode waveforms." Although different types of isolators have been designed to attenuate or reduce acoustic wave movement through BHA 130, isolators may not remove all tool mode waveforms. Additionally, tool mode waveforms may dominate and "hide" formation arrival acoustic waveforms. Thus, tool mode waveforms may interfere with recording formation arrival waveforms.

Figure 4:
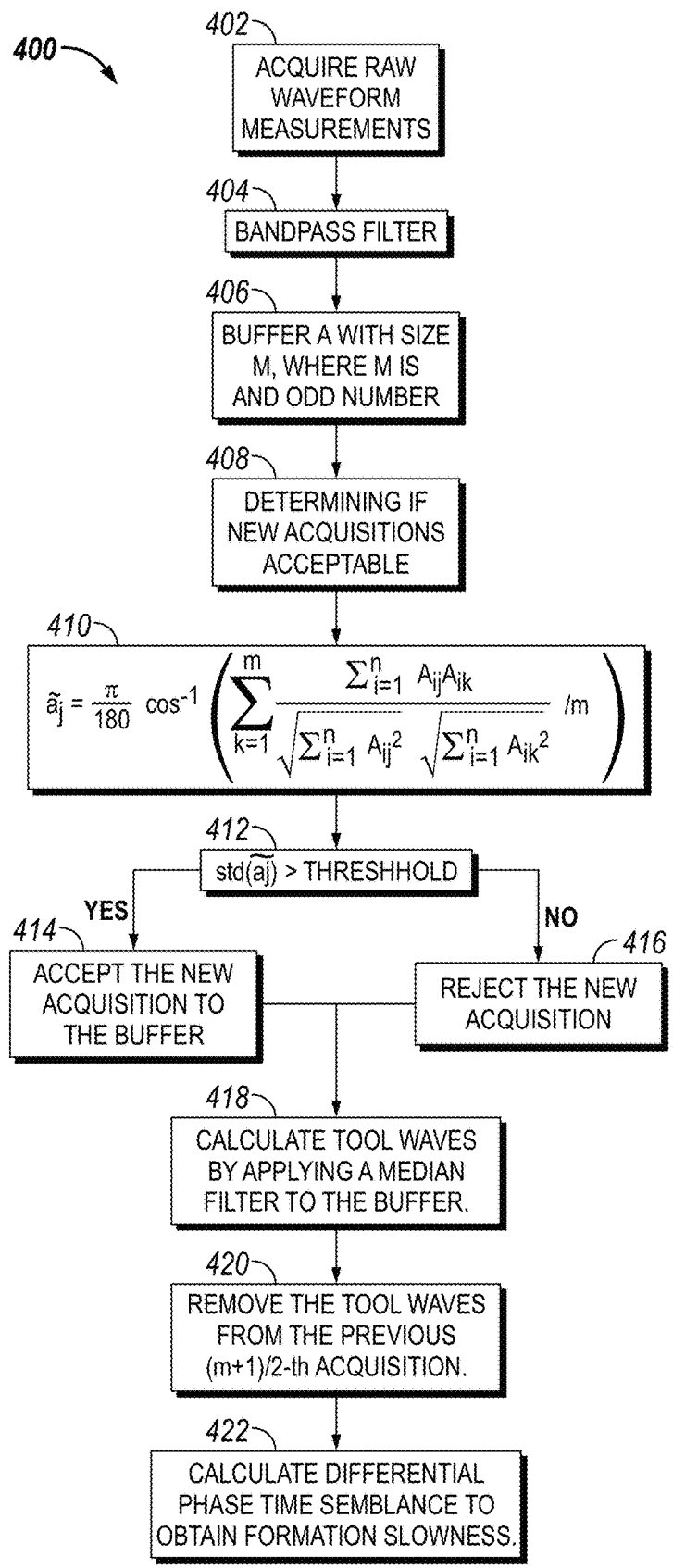
FIG. 4 is a workflow for removing tool mode waveforms.

FIG. 4 illustrates workflow 400 which may be utilized to remove tool mode waveforms in real time from waveform measurements taken during LWD operations. Workflow 400 may begin with block 402 in which raw waveform measurements are acquired during LWD operations. These raw waveform measurements may be acquired using the techniques and systems described above. The raw waveform measurements may be transferred to information handling system 138 for processing. Raw waveform measurements may be transferred to information handling system 138 by systems and methods described above. Blocks 402 through 422 may be performed on information handling system 138. Referring back to FIG. 4, from block 402, raw waveform measurements may be filtered through a bandpass filter in block 404. In block 404, the bandpass filter may comprise a frequency range from about 5 kHz to about 20 kHz. The bandpass filter may be used for removing low-frequency biases and high-frequency noises. In examples, if recorded waveforms have negligible low-frequency biases and/or high-frequency noises, using bandpass filter in block 404 may be optional. In other examples, if recorded waveforms only contain low-frequency biases, a high pass filter with a cutoff frequency of about 5 kHz may be applied in block 404. Additionally, if recorded waveforms only contain high-frequency noises, a low pass filter with a cutoff frequency of about 20 kHz may be applied. Filtered waveforms from block 404 may then move to block 406.

In block 406, filtered waveforms may be used to populate a buffer which may be a size m until the buffer is full. The size m for the buffer may be empirically determined based at least in part on drilling operations. For example, a higher rate of penetration during drilling operation may necessitate a smaller size m, or vice versa. Generally, m may range from about 40 to 250 recorded waveforms being utilized in the buffer. The buffer collects all waveforms from a set of neighboring measurements performed in block 402. These acquired waveforms may comprise tool mode waveform signatures that may be similar in nature. However, the acquired waveform may also comprise formation waveform signatures. Estimated tool mode waveforms, which may be similar in nature, may be distilled in the buffer by averaging. After populating the buffer in block 406, one or more additions of measured waveforms may be added to the buffer during real time measurements. In block 408, a next acquisition m+1, the new waveform acquisition is stacked in the buffer and the oldest waveform may be removed from the buffer and discarded. However, the updated buffer may undergo a decision step to determine whether the updated buffer may accept the new waveform acquisition or revert to the old buffer by rejecting the new waveform acquisition, this decision step is found in block 410.

In block 410, the decision step starts by selecting a chosen receiver 137 in a receiver array. By default, a first receiver in a receiver array may be chosen. However, personnel may choose any receiver in the receiver array. Next, a parameter $\tilde{a}_j$, which characterizes how diverse the waveforms may be in the buffer, may be calculated using:

$$\tilde{a}_J = \frac{\pi}{180} \cos^{-1}\left( \sum_{k=1}^{m} \frac{\sum_{k=1}^{n} A_{ij} A_{ik}}{\sqrt{\sum_{k=1}^{n} A_{ij}^2} \sqrt{\sum_{k=1}^{n} A_{ik}^2}} / m \right) \quad (1)$$

As seen in Equation (1), $\tilde{a}_j$ depends on the elements $A_{ij}$ in the buffer, undergoing normalization and nonlinear transform. For the variable $A_{ij}$, A represents the buffer, i is the row index, and j is the column index. After obtaining $\tilde{a}_j$ in block 410, in block 412, a standard deviation of $\tilde{a}_j$ may be computed and compared with a specified threshold value.

The threshold value is determined empirically. Initially, the threshold value may be set at or about zero. With this initial threshold value, measured waveforms from block 402 will have both tool mode waveforms and formation waveforms removed from one or more measurements made at a depth in block 402. From this starting point, the threshold value may be increased until the resulting waveforms have removed tool mode waveforms while formation waveforms remain as the resulting waveform. At this point, the threshold value is determined and may be maintained.

Referring back to block 412, if the standard deviation is greater than the threshold, workflow 400 moves to block 414, where the new waveform acquisition is accepted in the buffer, i.e., the updated buffer is kept. However, in block 412 if the standard deviation is less than the threshold, workflow 400 move to block 416, where the new wave acquisition is rejected, and the original buffer is kept. Here, the cosine function is adopted as the nonlinear transformation, but other functions that serve to smoothen the steep transition region of the summation in the parentheses may also be utilized. In another examples, Equation (1) may be substituted with the following Equation:

$$\tilde{a}_J = \frac{\pi}{180} \cos^{-1}\left( \sum_{k=1}^{m} \frac{\sum_{k=1}^{n} A_{ij} A_{ik}}{\sqrt{\sum_{k=1}^{n} A_{ij}^2} \sqrt{\sum_{k=1}^{n} A_{ik}^2}} / (m-1) \right) \quad (2)$$

Additionally, in block 412 the mean average instead of a standard deviation average is used. It should be noted that a large threshold value for Equation (2) may be those greater than 70 and a small threshold value may be a value less than 50. In examples, a properly selected threshold value for Equation (2) may fall between 50 and 70.

After the buffer is updated in blocks 414 or 416, a median filter and/or mean filter is applied to the buffer in block 418. This may allow for information handling system 138 (e.g., referring to FIG. 1) to calculate for tool mode waveforms. After calculating for tool mode waveforms in block 418, in block 420 the calculated tool mode waveforms may be removed from the previous $$\frac{(m+1)}{2}$$

acquisitions. The introduction of the output "delay" ensures accurately capturing those abrupt slowness transitions in real-time sonic logs. The output delay is defined as an index shift between a current acquisition and a processed acquisition. As noted above, the output delay starts after the (m+1) acquisitions. However, if the buffer is not filled, it doesn't generate a valid output. After calculating a waveform free of tool mode waveforms at the previous $$\frac{(m+1)}{2}$$

acquisitions in block 420, a differential phase time semblance map is formed in block 422 to obtain formation slowness at previous $$\frac{(m+1)}{2}$$

acquisitions. The differential phase time semblance map formed in block 422 is done in real time using workflow 400, which derives formation slowness values. Additionally, a formation slowness log may be formed based at least in part from the differential phase time semblance map. As seen above, workflow 400 may operate and function on acquisitions taken during drilling operations. Additionally, no depth information is needed to calculate a formation slowness that is at least in part free of tool mode waveforms. Therefore, it improves real-time acoustic LWD operations, as depth logs may not be needed to remove tool mode waveforms from formal slowness logs.

Figure 5A:
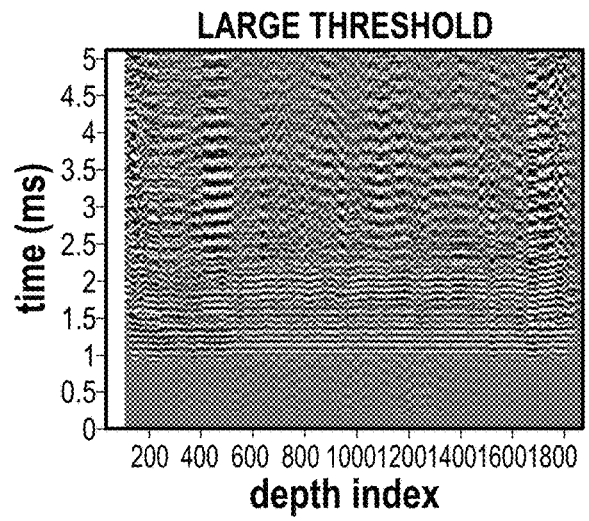
FIGS. 5A-5D are graphs illustrating the implementation of the workflow for removing tool mode waveforms.
Figure 5B:
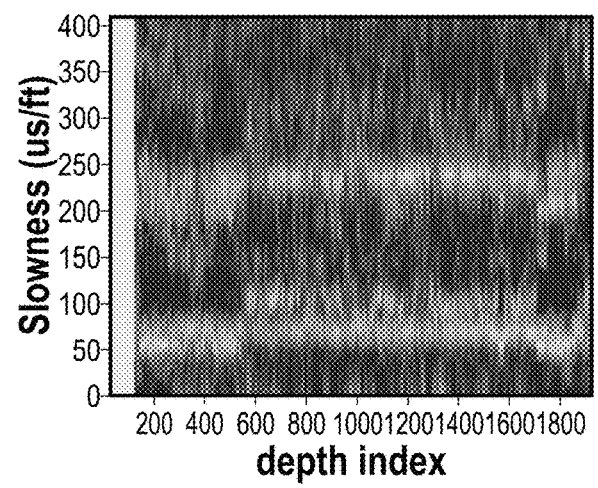
Figure 5C:
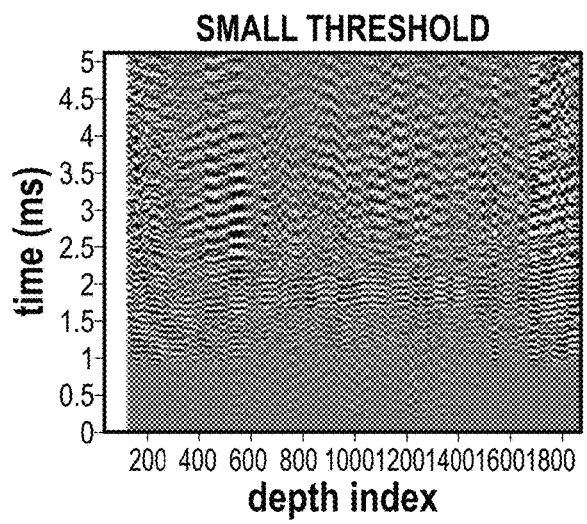
Figure 5D:
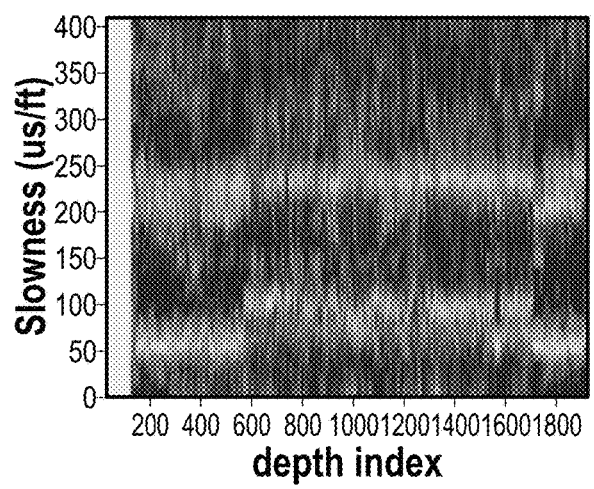

To validate the effectiveness of workflow 400, FIGS. 5A-7B implement workflow 400 on real sonic data captured during actual LWD operations. For example, FIG. 5A is a graph illustrated raw waveforms from the sonic log and applying a large threshold value in workflow 400, the waveforms then contain the constant arrival signature around 1 millisecond. The value that is considered large would be those larger than 10. Using workflow 400, FIG. 5B is a graph illustrating the resultant semblance plot, which shows the constant slowness around 75 us/ft induced by tool mode waveforms. This shows that tool mode waveform slowness intertwines with formation compressional wave slowness and makes the formation slowness faint and hard to identify. By contrast, FIG. 5C is a graph is a graph illustrated raw waveforms from the sonic log and applying a small value in workflow 400, the waveforms then contain the constant arrival signature around 1 millisecond. The value that is considered small would be those less than 2. This may be seen in FIG. 5C in that the waveforms clearly show wriggling wave fronts, which confirms that tool mode waveforms have been removed. FIG. 5D further is a semblance map based on the information from FIG. 5C. The graph in FIG. 5C illustrates that compressional wave slowness stands out and may be easily read, thus, the tool mode waveform slowness may have been suppressed.

Figure 6A:
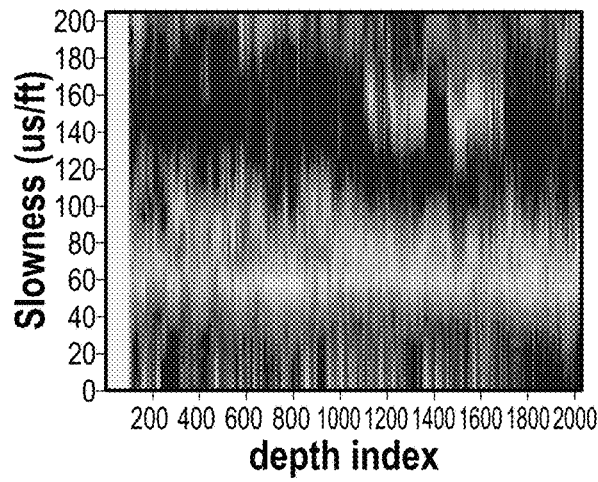
FIGS. 6A and 6B are graphs further illustrating the implementation of the workflow for removing tool mode waveforms.
Figure 6B:
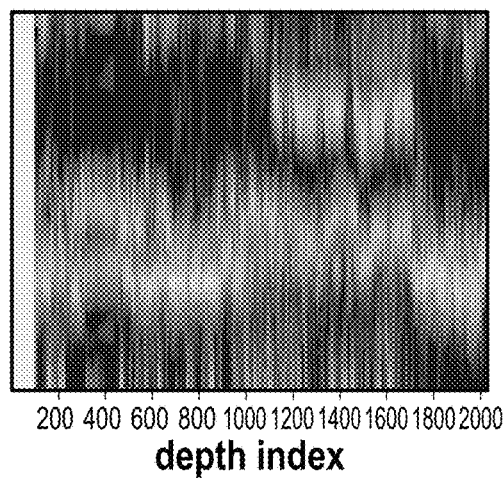

FIGS. 6A and 6B illustrate another example using actual field data with workflow 400. FIG. 6A is a graph that illustrates a semblance map formed from raw waveforms using field data. As illustrated in FIG. 6A, the plot has a constant slowness around 60 us/ft, which is identified as tool mode waveforms. Tool mode waveform slowness at identified acquisition ranges may be close to formation compressional wave slowness and makes the formation slowness difficult to interpret. FIG. 6B is a graph implementing workflow 400. The semblance map in FIG. 6B shows compressional wave slowness standing out and tool mode waveform slowness being suppressed.

Figure 7A:
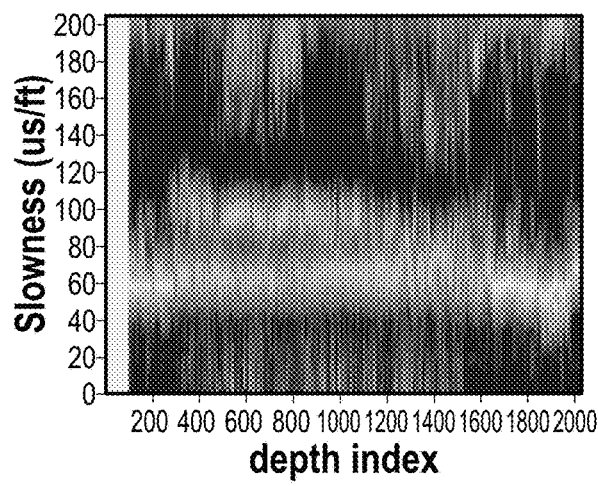
FIGS. 7A and 7B are graph further illustrating the implementation of the workflow for removing tool mode waveforms.
Figure 7B:
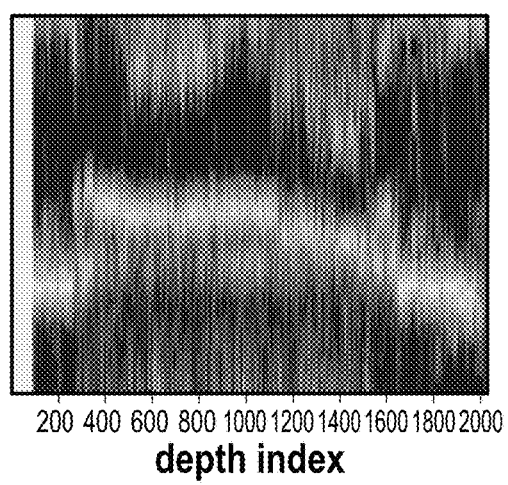

Further, FIGS. 7A and 7B illustrate another example using field data with workflow 400. FIG. 7A is a graph that illustrates a semblance map formed from raw waveforms using field data. As illustrated, the graph has a constant slowness around 60 us/ft marked as tool mode. Further illustrated in FIG. 7A, tool mode waveform slowness may be close to formation compressional wave slowness, such as near the depth index 1500, which shows that the formation arrivals may be interfered with. By contrast, as illustrated in semblance map of FIG. 7B, applying workflow 400 to the raw waveforms in FIG. 7A shows compressional wave slowness standing out and tool mode waveform slowness being suppressed.

The methods and systems discussed above are improvements over current technology. Specifically, proposed workflow utilizes a buffer for tool mode waveform estimation and delayed processing for tool mode waveform removal. Compared with the current technology, the proposed workflow adaptively chooses the waveforms that contains similar tool mode waveform signatures but have different formation arrival signatures, which improves tool mode waveform estimation. Additionally, the proposed workflow is independent of depth. This allows for effective tool mode waveform removal, as logging while drilling tools may have a very low rate of penetration (multiple acquisitions at the same depth). Conventional methods always rely on a depth log to perform tool mode waveform removal. However, in real time the depth log is not available. The methods and systems described above only rely on waveform acquisitions while removing tool mode waveforms in real-time without a depth log. The preceding description provides various embodiments of systems and methods of use which may contain different method steps and alternative combinations of components.

Statement 1. A method may comprise disposing a bottom hole assembly (BHA) into a wellbore. The BHA may comprise at least one transmitter configured to transmit a pressure pulse and at least one receiver configured to record one or more waveforms. The method may comprise performing a logging-while-drilling (LWD) operation in which the one or more waveforms are recorded with the at least one receiver, transmitting the one or more waveforms to an information handling system, removing one or more tool mode waveforms from the one or more waveforms to form an updated set of waveforms, and forming differential phase time semblance map based at least in part on the updated set of waveforms.

Statement 2. The method of statement 1, further comprising filtering the one or more waveforms with a bandpass filter to form one or more filtered waveforms.

Statement 3. The method of statement 2, further comprising populating a buffer with the one or more filtered waveforms.

Statement 4. The method of statement 3, further comprising measuring a second set of waveforms.

Statement 5. The method of statement 4, further comprising adding the second set of waveforms to the buffer and removing an oldest waveform set in the buffer.

Statement 6. The method of statement 5, further comprising characterizing how diverse the second set of waveforms, the oldest waveform, and the one or more waveforms are in the buffer to form a characterized set of waveforms.

Statement 7. The method of statement 6, further comprising performing a standard deviation on the characterized set of waveform.

Statement 8. The method of statement 7, further comprising comparing the standard deviation to a threshold.

Statement 9. The method of statement 8, further rejecting the second set of waveforms if the standard deviation is less than the threshold.

Statement 10. The method of statement 8, further accepting the second set of waveforms if the standard deviation is less than the threshold and removing the oldest waveforms.

Statement 11. A system may comprise a bottom hole assembly (BHA). The BHA may comprise at least one transmitter configured to transmit a pressure pulse and at least one receiver configured to record one or more waveforms. The system may comprise an information handling system configured to removing one or more tool mode waveforms from the one or more waveforms to form an updated set of waveforms and forming a formation slowness log based at least in part on the updated set of waveforms.

Statement 12. The system of statement 11, wherein the information handling system is further configured to filter the one or more waveforms with a bandpass filter to form one or more filtered waveforms.

Statement 13. The system of statement 12, wherein the information handling system is further configured to populate a buffer with the one or more filtered waveforms.

Statement 14. The system of statement 13, wherein the information handling system is further configured to measure a second set of waveforms.

Statement 15. The system of statement 14, wherein the information handling system is further configured to add the second set of waveforms to the buffer and removing an oldest waveform set in the buffer.

Statement 16. The system of statement 15, wherein the information handling system is further configured to characterize how diverse the second set of waveforms, the oldest waveform, and the one or more waveforms are in the buffer to form a characterized set of waveforms.

Statement 17. The system of statement 16, wherein the information handling system is further configured to perform a standard deviation on the characterized set of waveform.

Statement 18. The system of statement 17, wherein the information handling system is further configured to compare the standard deviation to a threshold.

Statement 19. The system of statement 18, wherein the information handling system is further configured to reject the second set of waveforms if the standard deviation is less than the threshold.

Statement 20. The system of statement 18, wherein the information handling system is further configured to accept the second set of waveforms if the standard deviation is less than the threshold and removing the oldest waveform.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    disposing a bottom hole assembly (BHA) into a wellbore, wherein the BHA comprises:
    at least two transmitter configured to transmit a pressure pulse; and
    at least two receiver configured to record two or more waveforms;
    performing a logging-while-drilling (LWD) operation in which the two or more waveforms are recorded with the at least two receiver;
    transmitting the two or more waveforms to an information handling system;
    removing two or more tool mode waveforms from the two or more waveforms to form an updated set of waveforms after two or more individual recordations of the two or more waveforms; and
    forming differential phase time semblance map based at least in part on the updated set of waveforms.

2. The method of claim 1, further comprising filtering the two or more waveforms with a bandpass filter to form one or more filtered waveforms.

3. The method of claim 2, further comprising populating a buffer with the one or more filtered waveforms.

4. The method of claim 3, further comprising measuring a second set of waveforms.

5. The method of claim 4, further comprising adding the second set of waveforms to the buffer and removing an oldest waveform set in the buffer.

6. The method of claim 5, further comprising characterizing how diverse the second set of waveforms, the oldest waveform set, and the two or more waveforms are in the buffer to form a characterized set of waveforms.

7. The method of claim 6, further comprising performing a standard deviation on the characterized set of waveforms.

8. The method of claim 7, further comprising comparing the standard deviation to a threshold.

9. The method of claim 8, further comprising rejecting the second set of waveforms if the standard deviation is less than the threshold.

10. The method of claim 8, further comprising accepting the second set of waveforms if the standard deviation is less than the threshold and removing the oldest waveforms.

11. A system comprising:
    a bottom hole assembly (BHA) that comprises:
    at least one transmitter configured to transmit a pressure pulse; and at least one receiver configured to record two or more waveforms; and an information handling system configured to:
    remove one or more tool mode waveforms from the two or more waveforms to form an updated set of waveforms after two or more individual recordations of the two or more waveforms; and
form a formation slowness log based at least in part on the updated set of waveforms.

12. The system of claim 11, wherein the information handling system is further configured to filter the two or more waveforms with a bandpass filter to form one or more filtered waveforms.

13. The system of claim 12, wherein the information handling system is further configured to populate a buffer with the one or more filtered waveforms.

14. The system of claim 13, wherein the information handling system is further configured to measure a second set of waveforms.

15. The system of claim 14, wherein the information handling system is further configured to add the second set of waveforms to the buffer and removing an oldest waveform set in the buffer.

16. The system of claim 15, wherein the information handling system is further configured to characterize how diverse the second set of waveforms, the oldest waveform set, and the two or more waveforms are in the buffer to form a characterized set of waveforms.

17. The system of claim 16, wherein the information handling system is further configured to perform a standard deviation on the characterized set of waveforms.

18. The system of claim 17, wherein the information handling system is further configured to compare the standard deviation to a threshold, wherein the information handling system is further configured to reject the second set of waveforms if the standard deviation is less than the threshold.

19. The system of claim 17, wherein the information handling system is further configured to compare the standard deviation to a threshold, wherein the information handling system is further configured to accept the second set of waveforms if the standard deviation is less than the threshold and remove the oldest waveform.

20. A method comprising:
disposing a bottom hole assembly (BHA) into a wellbore, wherein the BHA comprises:
    at least one transmitter configured to transmit a pressure pulse; and
    at least one receiver configured to record onetwo or more waveforms;
performing a logging-while-drilling (LWD) operation in which the two or more waveforms are recorded with the at least one receiver;t
transmitting the two or more waveforms to an information handling system;
removing one or more tool mode waveforms from the one or more waveforms to form an updated set of waveforms after two or more individual recordations of the two or more waveforms; and
forming differential phase time semblance map based at least in part on the updated set of waveforms, wherein the differential phase time semblance map is performed in real-time.

* * * * *